United States Patent [19]

Linberg et al.

[11] 4,239,274
[45] Dec. 16, 1980

[54] SELF-TIGHTENING CLAMP FOR THE SUSPENSION OF GLASS SHEETS

[75] Inventors: Waldemar Linberg, Herzogenrath; Mario Roth; Hans-Peter Siemonsen, both of Aachen, all of Fed. Rep. of Germany

[73] Assignee: Saint Gobain Industries, Neuilly-sur-Seine, France

[21] Appl. No.: 47,695

[22] Filed: Jun. 12, 1979

[30] Foreign Application Priority Data

Jun. 15, 1978 [FR] France .................. 78 17910

[51] Int. Cl.³ .............................................. B66C 1/48
[52] U.S. Cl. ................................. 294/114; 294/106
[58] Field of Search ............... 294/86 R, 101, 102 R, 294/104, 106, 110 R, 113–115, 118, DIG. 1

[56] References Cited

U.S. PATENT DOCUMENTS

| | | | |
|---|---|---|---|
| 542,985 | 7/1895 | Bolsinger | 294/114 X |
| 1,266,233 | 5/1918 | Eckerson | 294/114 |
| 2,341,421 | 2/1944 | Boree et al. | 294/104 |
| 2,366,157 | 1/1945 | Stahl | 294/106 |
| 2,379,652 | 7/1945 | Renfroe | 294/104 |
| 2,646,307 | 7/1953 | Phalin | 294/114 |
| 3,606,443 | 9/1971 | Painter et al. | 294/106 |

FOREIGN PATENT DOCUMENTS

| | | | |
|---|---|---|---|
| 862825 | 1/1953 | Fed. Rep. of Germany | 294/114 |
| 256195 | 6/1968 | U.S.S.R. | 294/114 |

*Primary Examiner*—Johnny D. Cherry
*Attorney, Agent, or Firm*—Pennie & Edmonds

[57] ABSTRACT

A self-tightening clamp adapted on closure to suspend a sheet of glass where the clamp includes a stirrup and levers pivotally mounted on the ends of the stirrup with a sheet engaging stud at the end of each lever positioned above the pivot point of the lever. An arm is pivotally mounted at one end to the end of each lever and at its other end is pivotally connected to a suspension link. Guides are associated with the stirrup and the suspension link to assure that the stirrup will move vertically with respect to the suspension link during opening and closing of the clamp. Stops are associated with the stirrup to limit pivotal movement of the levers towards each other and to limit movement of the studs towards each other whereby when the clamp is fully closed, the studs are spaced apart slightly less than the width of the sheet with which they are to engage so as to embed slightly into the sheet.

5 Claims, 4 Drawing Figures

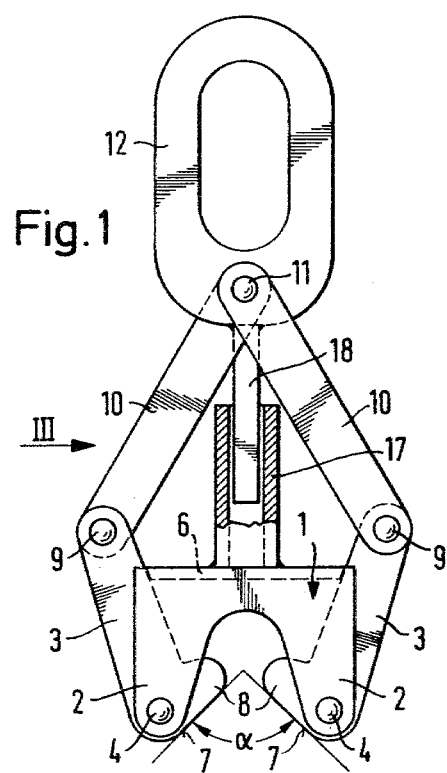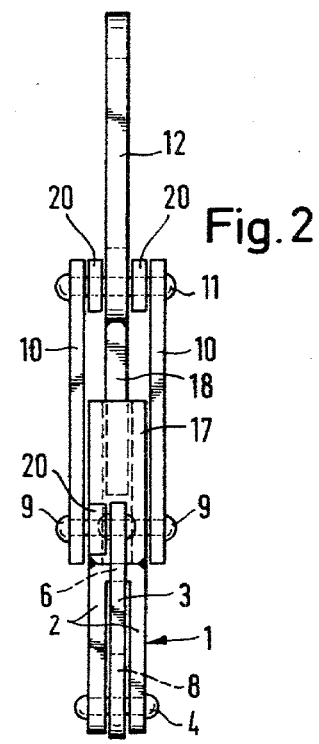

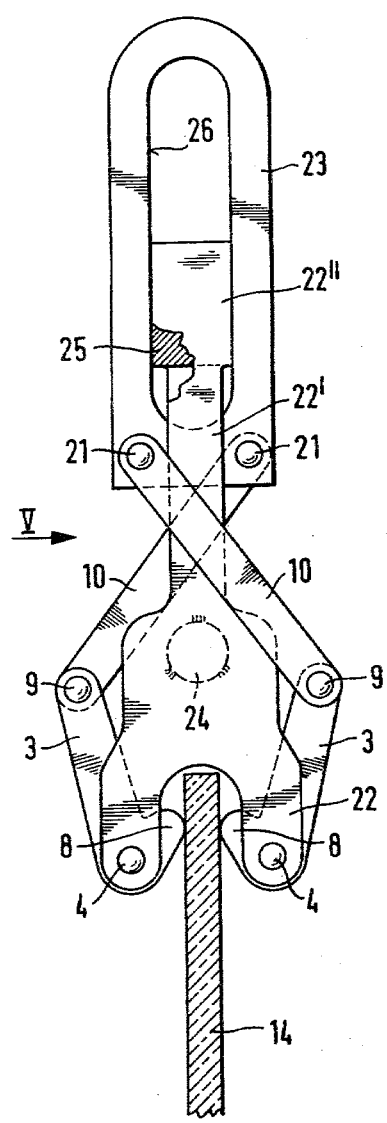
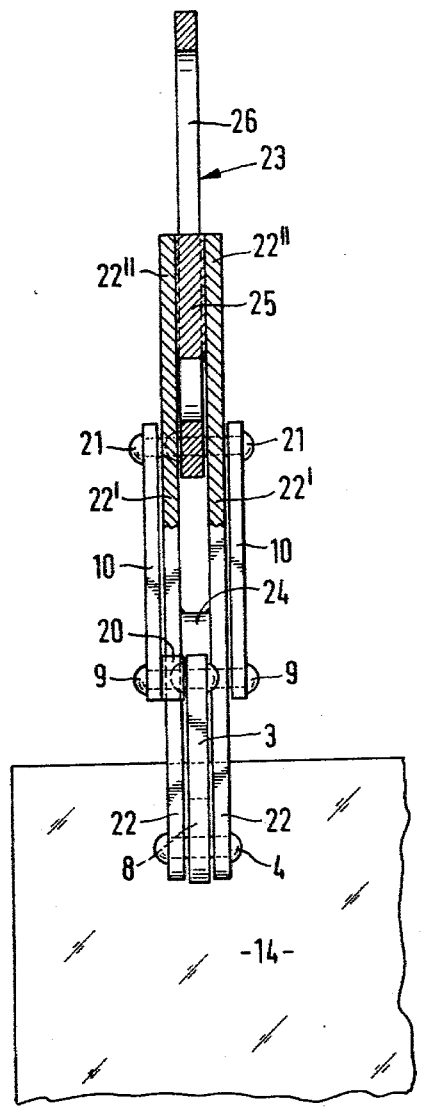

SELF-TIGHTENING CLAMP FOR THE SUSPENSION OF GLASS SHEETS

TECHNICAL FIELD

The invention relates to a self-tightening clamp adapted to suspend a sheet of glass during heat treatment and where the clamp closes under the influence of the weight of the sheet. The clamp includes a stirrup with two levers pivoted at the stirrup ends and where each lever has a sheet engaging stud. Stop means are provided for limiting movement of the sheet engaging studs towards each other on closure of the clamp. The levers are connected by arms to a suspension link and guide means are provided to insure that the stirrup supporting the levers may move vertically with respect to the suspension link and remain in alignment with the link during engagement and disengagement of the clamp with a sheet.

BACKGROUND ART

Self-tightening clamps have been utilized in the past for suspending objects, for example sheets of glass during treatment of the sheet. A typical such clamp is disclosed and described in U.S. Pat. No. 2,646,307 and which includes a stirrup having two gripping levers pivoted on the end of the stirrup and where the levers have a cam-shaped sheet engaging portion on their ends. The ends of the levers in turn are connected by arms to a suspension link. As constructed the levers of the device of that patent have no means for limiting movement of the cam-shaped portions towards each other such that the portions may dig into a hot deformable sheet an excess amount making automatic disengagement difficult. Further in clamps of this type, no means are provided for assuring that the stirrup supporting the levers will remain in alignment with the suspension link during engagement and disengagement, therefore making automatic engagement and disengagement difficult.

As a result production problems have arisen with prior art self-clamping devices in that the clamps do not always properly engage or clamp onto a sheet of glass or where it is difficult to automatically release a sheet once it has been fully clamped by the device.

It is therefore an object of the invention to provide for a self-tightening clamp which may properly engage and clamp a sheet of glass wherein the clamp will be stabilized in an angular position with respect to the sheet to insure that the clamp will properly engage the sheet and to further insure that the clamp may be easily opened with respect to the sheet.

DISCLOSURE OF INVENTION

Broadly the invention comprises a self-tightening clamp which on closure is adapted to suspend a sheet of glass. The clamp includes a stirrup and a lever pivotally mounted on each end of the stirrup where the lever has on one end a sheet engaging stud. The lever is pivotally mounted with respect to the stirrup so that its pivot point is positioned below the stud. One end of an arm is pivoted to the other end of the lever and the other end of the arm is pivotally connected to a suspension link. Guide means are associated with the stirrup and the suspension link to insure that the stirrup may move vertically and be aligned with respect to the suspension link and to further insure proper engagement of the studs with a sheet of glass. Stops are provided on the stirrup for limiting pivotal movement of the levers and the stud portions towards each other with the limit being such that the space between the studs is slightly less than the width of a sheet of glass when the clamp is in a fully closed position. This allows the studs to penetrate the surface of a softened sheet only a slight amount. The studs are so shaped that the angle between the lower flanks of the studs is less than 120° and preferably less than 90°.

In one form of the invention the guide means associated with the stirrup comprises a sleeve integral with the stirrup and the guide means associated with the suspension link comprises a pin integral with the link and slidable in the sleeve.

In a further embodiment of the invention, the guide means associated with the link comprises a slot in the link and the guide means associated with the stirrup comprises a slide connected to the stirrup and slidable in the slot.

BRIEF DESCRIPTION OF DRAWINGS

FIG. 1 is a partial sectional front view of a self-tightening clamp constructed according to the invention;

FIG. 2 is a side view of FIG. 1;

FIG. 3 is a partial sectional side view of a further embodiment of a self-tightening clamp constructed according to the invention; and FIG. 4 is a partial sectional side view of FIG. 3.

BEST MODE FOR CARRYING OUT THE INVENTION

Referring to FIG. 1, a self-tightening clamp constructed according to the invention is illustrated where the clamp includes a rigid stirrup 1 having a lever 3 pivoted at each of its ends about a pin 4. A stud 8 is contained in one end of each lever and is adapted to engage a sheet of glass. As shown the studs 8 are positioned above the pivot pins 4. An arm 10 is pivotally mounted by a pin 9 to the opposite end of each lever 3 from the stud 8 and both arms in turn are pivoted to a suspension link 12 by pin 11. As shown in FIG. 2, the stirrup 1 comprises two walls connected by a top cover 6 with the levers 3 being movable between the two walls.

The stirrup 1 has a guide member 17 in the form of a sleeve integral therewith which cooperates with a guide member or pin 18 which is integral with suspension link 12. Guide members 17 and 18 prevent the parts of the clamp from becoming misaligned with respect to each other and swinging with respect to a sheet of glass during engagement and disengagement. This is of particular advantage when automatic devices are used for effecting engagement and disengagement.

The spacing necessary to accommodate sleeve 17 between arms 10 is provided by washers 20, arms 10 and link 12 on pin 11 and arms 10, washers 20 and levers 3 on pins 9.

As shown in FIG. 1 the ends of the cross piece 6 act as a stop to prevent movement of the levers 3 towards each other and so limit at the same time movement of the studs 8 towards each other. The cross piece 6 is so dimensioned that the studs 8 in their fully closed position penetrate slightly into the surface of a softened glass sheet and thus the spacing between the sheet engaging portions of the stud when in the fully closed position is slightly less than the thickness of the sheet with which they are to engage. This assures that the studs will penetrate only a little distance in a soft sheet and facilitates the disengagement of the sheet. The angle α which is formed by the lower rectilinear flanks 7 of the studs 8 should be less than 120° and preferably less than 90°.

Pins 4, 9 and 11 may comprise rivets. Arms 10 and levers 3 including the studs 8 are made from stamped parts comprising a refractory steel on the order of 2 mm. thickness. Stirrup 1 is also formed from a stamped part which is bent into shape and comprises a 2 mm. thickness steel sheet. This construction utilizing stamped parts is economical to manufacture as compared with prior art clamps which utilize expensive forged parts.

Referring to FIGS. 3 and 4 there is illustrated a further embodiment of the invention in which similar parts have the same identifying numerals as in FIGS. 1 and 2. As shown, the self-tightening clamp of this embodiment comprises a stirrup 22 made of two identical flat sheets comprising the stirrup proper as well as a guide rod portion 22' and an enlarged slide portion 22" at the end of the guide rod portion. The two sheets are assembled by means of cross pieces 24 and 25 by spot welding. The width of cross piece 25 corresponds to the width of slot 26 so that it may slide therein. The slot 26 as shown forms a guide member associated with the suspension link 23 and the slide portion 22" forms a guide member associated with the stirrup 22.

Arms 10 are each connected by a separate pin 21 to the bottom of the suspension link 23 rather than by a common pin as in the case of the embodiment of FIG. 1.

The sheet engaging portions of the studs 8 engage a sheet of glass 14 in the same manner and with the same degree of engagement as the constructions of FIGS. 1 and 2. In this construction the stop portions of the stirrup is determined by the width of the stirrup where the washers 20 would engage the edges of the stirrup. In all other respects the construction of FIGS. 3 and 4 as well as its operation is the same as that of FIGS. 1 and 2.

We claim:

1. In a self-tightening clamp adapted on closure to suspend a sheet of glass for heat treatment wherein said clamp includes a stirrup, a lever pivotally mounted on each end of said stirrup having a sheet engaging stud at an end thereof above the pivot point of the lever, an arm pivotally mounted on the end of each said lever opposite said stud, and a suspension link pivotally connected to the end of each arm opposite said lever; the improvement comprising in that said stirrup and said suspension link each has a vertically extending guide member with the members cooperating together to assure that said stirrup may move vertically with respect to said suspension link during opening and closing of said clamp, in having stops associated with said stirrup which limit pivotal movement of the levers and associated studs towards each other whereby said studs on a complete closure of the clamp are spaced apart slightly less than the thickness of a glass sheet which they are adapted to engage, and wherein the lower flanks of the studs in the position limited by the stops form an angle less than 120° with respect to each other.

2. In a self-tightening clamp according to claim 1 wherein the lower flanks of the studs form an angle less than 90° with respect to each other.

3. In a self-tightening clamp according to claim 1 wherein said stirrup comprises two walls spaced from one another and between which said levers are pivoted and a cover connecting the top of said walls.

4. In a self-tightening clamp according to claim 3 wherein the guide member of said stirrup comprises a sleeve and the guide member of the suspension link comprises a pin slidable in said sleeve.

5. In a self-tightening clamp according to claim 3 wherein the guide member of said stirrup comprises a slide and wherein the guide member of said suspension link comprises a slot.

* * * * *